(12) United States Patent
Chabanne et al.

(10) Patent No.: US 8,681,972 B2
(45) Date of Patent: Mar. 25, 2014

(54) METHOD OF EXECUTING A CRYPTOGRAPHIC CALCULATION

(75) Inventors: Herve Chabanne, Paris (FR); Julien Bringer, Paris (FR); Thomas Icart, Paris (FR)

(73) Assignee: MORPHO, Paris (FR)

(*) Notice: Subject to any disclaimer, the term of this patent is extended or adjusted under 35 U.S.C. 154(b) by 598 days.

(21) Appl. No.: 12/600,197

(22) PCT Filed: May 9, 2008

(86) PCT No.: PCT/FR2008/050817
§ 371 (c)(1), (2), (4) Date: May 4, 2011

(87) PCT Pub. No.: WO2008/145936
PCT Pub. Date: Dec. 4, 2008

(65) Prior Publication Data
US 2011/0213972 A1    Sep. 1, 2011

(30) Foreign Application Priority Data
May 15, 2007   (FR) ..................... 07 03483

(51) Int. Cl.
*G06F 21/00* (2013.01)

(52) U.S. Cl.
USPC ............. 380/28; 380/255; 380/259; 380/263; 380/29; 713/164; 713/166; 713/167; 713/187; 713/188; 713/189; 713/194; 726/22; 726/23; 726/24; 726/25

(58) Field of Classification Search
USPC ............. 380/255–263, 28–29; 713/164–167, 713/182–194; 726/22–25
See application file for complete search history.

(56) References Cited

U.S. PATENT DOCUMENTS

| 5,517,567 A * | 5/1996 | Epstein .................. 380/247 |
| 6,097,815 A * | 8/2000 | Shimada .................. 380/46 |
| 7,100,051 B1 * | 8/2006 | Kipnis et al. .................. 713/180 |
| 7,471,791 B1 * | 12/2008 | Coron et al. .................. 380/29 |
| 7,472,274 B2 * | 12/2008 | Moreaux et al. ............. 713/168 |

(Continued)

FOREIGN PATENT DOCUMENTS

WO    2007/116355 A2    10/2007

OTHER PUBLICATIONS

Gassend, B., "Physical Random Functions," Thesis for Masters of Science in Electrical Engineering and Computer Science, Massachusetts Institute of Technology, Feb. 2003, 89 pgs.

(Continued)

*Primary Examiner* — Madhuri Herzog
(74) *Attorney, Agent, or Firm* — Seed IP Law Group PLLC

(57) ABSTRACT

A cryptographic calculation is executed in an electronic component, according to a cryptographic algorithm including at least one application of a one-way function which is disabled upon an intrusion into the electronic component. The one-way function is based on a first affine operation corresponding to a first secret key. The one-way function is applied, by obtaining (11) first and second random values (r, r'), then, by obtaining a first result (13) by applying a second affine operation ($\sigma_K 1$), which corresponds to a second secret key, to a first combination (12) of the first and second random values, and, by obtaining (14) thereafter a second result by applying a third affine operation ($\sigma_K 2$) which corresponds to a third secret key to said first result. The combination of the third and second affine operations ($\sigma_K 1 \circ \sigma_K 2$) corresponds to the first affine operation; and a cryptographic operation is moreover applied (15) to one at least among said second result and a second combination of the first and second random values.

14 Claims, 3 Drawing Sheets

(56) References Cited

U.S. PATENT DOCUMENTS

2005/0265546 A1* 12/2005 Suzuki .......................... 380/44
2008/0044027 A1   2/2008 Van Dijk
2008/0231418 A1   9/2008 Ophey et al.
2008/0256600 A1  10/2008 Schrijen et al.

OTHER PUBLICATIONS

Guajardo, J. et al., "FPGA Intrinsic PUFs and Their Use for IP Protection," Proceedings of the 9th International Workshop on Cryptographic Hardware and Embedded Systems (CHES '07), LNCS 4727, pp. 63-80, 2007.

Molnar, D. et al., "A Scalable, Delegatable Pseudonym Protocol Enabling Ownership Transfer of RFID Tags," Proceedings of Selected Areas in Cryptography, 12th International Workshop, Kingston, ON, Canada, Aug. 11-12, 2005, 16 pgs.

Waldvogel, M. et al., "The VersaKey Framework: Versatile Group Key Management," IEEE Journal on Selected Areas in Communications 17(9):1614-1631, Sep. 1999.

\* cited by examiner

METHOD OF EXECUTING A CRYPTOGRAPHIC CALCULATION

The present invention relates to the management of cryptographic keys in electronic components, and more particularly in components which are constructed on the basis of a technique of the POK ("Physically Obfuscated Keys") type.

Cryptographic algorithms make it possible to secure the confidentiality of data based on the use of one or more secret keys. The level of security of the confidentiality of these data then depends on the level of security of the confidentiality of the secret key(s) used during the cryptographic operations carried out according to this algorithm.

When a cryptographic key is stored on an electronic component, it can be easy to discover the value thereof in a fraudulent manner, by an invasive method on the electronic component itself. Once in possession of the stored cryptographic key(s), it is then possible to access the data that were initially intended to remain confidential.

In this context, in order to increase the level of security attached to encrypted data, it is necessary to increase the level of protection of the stored cryptographic keys.

In this regard, a document "Physical Random Functions" by Blaise Gassend, Masters Thesis, dated February 2003, is known in which keys of the "Physically Obfuscated Keys" or POK type are defined, which are obtained by applying unclonable functions to input values. These unclonable functions on the one hand have a deterministic character, and on the other hand are difficult to characterise. In addition, upon an intrusion into the electronic component, they have the property of being destroyed.

Such functions are referred to as PUFs, for "Physical Unclonable Functions", in the aforementioned document.

Such a PUF function always supplies the same result value for the same input value. However, it is not possible to retrieve the input value from this result value, and it is also not possible to determine in advance the result value for a particular input value before having obtained this result value a first time by applying this PUF function.

A key of POK type is therefore a key obtained by applying an unclonable function. In this context, a key K of POK type can be obtained according to the following equation:

$$K = f(c) \oplus K';$$

where f is a function of PUF type; and where c is a given value stored in the electronic component, or "challenge"; and where K' is a key which is stored in the electronic component in which the obtaining of the key K is carried out.

A key of POK type is additionally characterised by the fact that any intrusion is destructive. Thus, as soon as an attempt at intrusion into the electronic component in question is detected, the means of implementing the function f of PUF type are disabled in said component.

In order to increase the level of security of confidentiality attached to a key K of POK type, it may be advantageous to apply the cryptographic operation based on the key K, in the form of two cryptographic operations based respectively on two partial keys $K_1$ and $K_2$, these two cryptographic operations being carried out successively.

Each of these operations, considered individually, reveals nothing about the value of the secret key K.

Under these conditions, an intrusive attack on the cryptographic component can at best only provide one of the two partial keys $K_1$ and $K_2$. Thus, such an attack does not make it possible to recover the key K of POK type in its entirety.

As Blaise Gassend writes in the aforementioned document, it is not easy to carry out the cryptographic operation based on the key K in this form of two cryptographic operations, particularly when it is desired that the two partial keys $K_1$ and $K_2$ are distinct for different cryptographic components using one and the same key K.

In this document, it is to this end proposed to determine two partial keys $K_1$ and $K_2$ by manipulating, in the context of an algorithm of Rivest-Shamir-Adleman or RSA type, a key K of POK type in the form of a combination of two partial keys. However, it is not always easy to implement an algorithm of RSA type on all electronic components, particularly when the latter have relatively small calculation capacities, since an algorithm of RSA type is complicated to carry out.

The present invention aims to make it possible to carry out such a cryptographic operation in different types of electronic components.

A first aspect of the present invention proposes a method of executing a cryptographic calculation in an electronic component, according to a given cryptographic algorithm including at least one application of a one-way function which is disabled upon an intrusion into the electronic component;

said one-way function being based on a first affine operation which corresponds to a first secret key;

said method comprising the following steps relating to the application of said one-way function:

/a/ obtaining first and second random values (r, r');

/b/ obtaining a first result by applying a second affine operation ($\sigma_{K1}$), which corresponds to a second secret key, to a first combination of the first and second random values;

/c/ obtaining a second result by applying a third affine operation ($\sigma_{K2}$), which corresponds to a third secret key, to said first result;

in which the combination of the third and second affine operations ($\sigma_{K2} \circ \sigma_{K1}$) corresponds to the first affine operation ($\sigma_K$); and in which a cryptographic operation is applied to one at least among said second result and a second combination of the first and second random values.

In one embodiment of the present invention, the one-way function is disabled since it is executed using a POK.

The second combination may be identical to or different from the first combination.

By proceeding in this way, a first affine operation, which may be a linear operation, is made to correspond to the first secret key. Then, this first affine operation is applied in the form of two successive affine operations, and thereafter a cryptographic operation is carried out, either on the result obtained previously or on another combination of the two random values.

The application of a cryptographic operation in one or the other of these cases mentioned above makes it possible to obtain an encrypted overall result. In one case, the encrypted overall result corresponds to the second encrypted result. In another case, the encrypted overall result is in two parts, the first part being the second result obtained and the second part corresponding to an encrypted combination of the two random values.

Here, the term "combination" is intended to mean any application which makes it possible to combine two values, such as for example the placing end-to-end of the two values in question, or the "exclusive or" operation, or else one of the two values.

Hereinbelow, the combinations of values used are referenced $comb_i$, i being an integer index. The use of identical, similar or different combinations may be provided.

By virtue of these measures, it is possible to protect the confidentiality of the secret key used to encrypt data, by splitting the application of the one-way function, which is based on this secret key, into the application of two successive secret sub-operations.

In order to discover the secret key, it is then necessary to retrieve the two secret sub-operations.

In an environment of POK type, in which the means used to apply the one-way function are destroyed, or else disabled, upon an intrusion into the electronic component in question, the electronic component can be opened in such a way that the second affine operation is discovered. In this case, however, the third affine operation can then no longer be discovered.

In another scenario, it can be envisaged that the electronic component is opened in such a way that the third affine operation is discovered. In this case, however, it is the second affine operation that it will be impossible to determine.

Thus, it is not possible under these conditions to discover the first secret operation on the hardware basis of the electronic component.

It should be noted that, by considering the secret key according to a first affine operation, it is easy to determine a plurality of pairs of second and third affine operations which, applied successively, make it possible to carry out the first affine application in two successive steps. Thus it is easy to encrypt data on the basis of a secret key of POK type, by providing for the data encryption to be implemented in two successive steps, so that this implementation is possible on any type of electronic components, including those that do not have large calculation capacities.

It is possible to provide that the cryptographic operation corresponds to a hash function or a pseudo-random function. For example, advantageously, this function may be implemented by virtue of a symmetrical encryption function such as AES, for "Advanced Encryption Standard".

In one embodiment of the present invention, when this cryptographic operation is applied to the second result, the first, second and third affine operations may correspond to linear bit-level permutations.

In this case, the combination of the first and second random values may correspond to the application of a cryptographic operation taking as input these first and second random values.

This latter cryptographic operation may also correspond to a hash function.

In one embodiment, the combination of the first and second random values corresponds to the application of an "exclusive or" operation between the first and second random values.

In one variant, when the cryptographic operation is applied to a second combination of the first and second random values, the first, second and third affine operations may correspond to "exclusive or" operations with the first, second and third secret keys respectively, the first secret key then being equal to the result of an "exclusive or" operation between the second and the third secret key.

Such a method of executing a cryptographic calculation can advantageously be implemented in the context of a method of identifying a radio tag. It thus makes it possible to protect effectively the confidentiality of the secret key that has been assigned to the radio tag in question.

A second aspect of the present invention therefore proposes a method of identifying a radio tag at an identification server, the identification server managing a plurality of secret keys according to a Q-ary tree having a root and a plurality of leaves, where Q is an integer greater than or equal to 2, each leaf of the tree corresponding to one secret key;

one secret key of said plurality of secret keys being associated with said radio tag;

said identification method comprising the following steps on said radio tag:

/1/ receiving a first random value from the identification server;

/2/ generating a second random value;

/3/ obtaining a result by applying a cryptographic calculation to the first and second random values based on at least part of said secret key associated with said radio tag; and /4/ transmitting said result to the identification server;

in which said cryptographic calculation is carried out using a method of executing a cryptographic calculation according to the first aspect of the present invention.

When the secret key is represented in the form of a plurality of parts respectively representing portions of a pathway from the root of the tree to the corresponding leaf, the above steps /1/ to /4/ can be repeated for each of said parts of the secret key.

It is also possible to provide that only steps /3/ and /4/ are repeated, thereby avoiding the need to generate anew the random values for each portion of the secret key, and to transmit them where appropriate.

Advantageously, each portion of the second secret key can be determined by a POK according to the following equation:

$$K = f(c);$$

where f is a function of PUF type; and where c is a given value stored in the electronic component, or "challenge".

It is thus possible to economise on the memory space used to store K', as defined above.

As stated above in relation to the method of executing the cryptographic calculation, in one variant it may therefore be provided here to obtain a third result by applying the cryptographic operation to the second result. In this context, in step /4/ of the identification method, the third result and also the second random value generated by the radio tag are transmitted to the identification server.

Next, with the identification server thus being in possession of the first and second random values and of the second encrypted result, it is then able to determine which secret key is associated with the corresponding radio tag and therefore to identify this radio tag. This determination is based on a calculation which is similar to the calculation carried out on the radio tag but which is applied to all the secret keys managed by the identification server. It may be noted that it is not necessary to carry out in the same way these calculations which are similar between the radio tag and the identification server. In fact, the identification server can execute the operation based on the secret key without splitting it in two.

It can then be decided whether the radio tag is identified based on a comparison between the results obtained at the end of these calculations and the result received from the radio tag.

In another variant, the cryptographic operation is applied to a second combination of the first and second random values. In this case, in step /4/, the second result and the result of the cryptographic operation on the second combination of the random values are transmitted to the identification server.

Again in this variant, the identification server is able to identify the radio tag based on a comparison between the results obtained by calculations similar to the one carried out by the radio tag on all the secret key that it manages and the information received from the tag, said information being the second result and the result of the cryptographic operation on a combination of r and r'.

A third aspect of the present invention proposes an electronic component suitable for executing a cryptographic calculation according to a given cryptographic algorithm including at least one application of a one-way function which is disabled upon an intrusion into the electronic component;

said one-way function being based on a secret key (K) which corresponds to a first affine operation ($\sigma_K$);

said electronic component comprising means suitable for implementing a method according to the first aspect of the present invention.

A fourth aspect of the present invention proposes a radio tag comprising an electronic component according to the third aspect of the present invention, said tag being suitable for implementing an identification method according to the second aspect of the present invention.

A fifth aspect of the present invention proposes a radio tag identification system, comprising an identification server and a tag according to the fourth aspect of the present invention.

Other aspects, aims and advantages of the invention will become apparent on reading the description of one of the embodiments thereof.

The invention will also be better understood with the aid of the drawings, in which:

FIG. 1 shows the main steps carried out according to one embodiment of the present invention in an electronic component.

Figure 1:
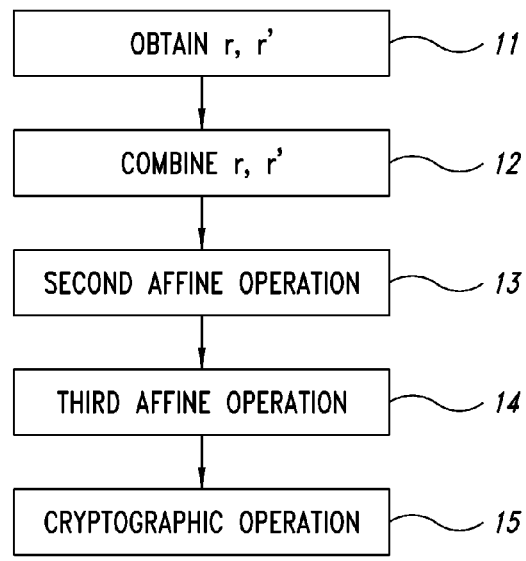
FIG. 1 shows the main steps of a method of executing a cryptographic calculation according to one embodiment of the present invention.

In a step 11, first and second random values r and r' are obtained. No limitation is attached to the present invention with regard to this step. In particular, it is possible here to provide that the electronic component is able to generate one of the two random values and that the other random value is received from outside this electronic component.

In a step 12, these first and second random values are combined, according to a combination $comb_i$.

In one variant, it is possible to provide for additionally applying a cryptographic operation to such a combination of these two random values r and r'. However, this step remains optional, the method according to one embodiment of the present invention being able to be carried out on any combination of these values r and r', such as an "exclusive or" operation, without applying a cryptographic operation. However, in order to further increase the level of security of the confidentiality of the key, it may be advantageous to apply in this step a cryptographic operation, such as for example a hash function.

The one-way function to be applied during the method of executing a cryptographic calculation according to one embodiment of the present invention is based on a secret key K. It is considered that an affine function corresponds to this secret key K, which affine function may be for example a first bit-level permutation $\sigma_K$ of the input value. By breaking down this first affine application $\sigma_K$ into a combination of at least a second and a third affine application, respectively $\sigma_{K1}$ and $\sigma_{K2}$, it is possible to increase the level of protection of the confidentiality of this first affine application and, therefore, of the secret key K corresponding thereto. In this context, the implementation of the one-way function is disabled immediately at the time of the first intrusion into the electronic component in question.

Thus, in a step 13, the second affine operation $\sigma_{K1}$ is applied to the result obtained at the end of the preceding step 12. Then, in a step 14, the third affine operation $\sigma_{K2}$ is applied to the result obtained in step 13.

Finally, in a step 15, a cryptographic operation, which may for example correspond to a hash function, is then applied to the result obtained in step 14.

At the end of step 15, an encrypted result is obtained by applying a method which includes the application of a one-way function taking into account a secret key K, without putting at risk the confidentiality of the value of the secret key at the time of executing this method.

In one variant, the cryptographic operation carried out in step 15 is applied to a combination of the two random values r and r', it being possible for this combination to be different from that used in step 12. In this case, the result encrypted by applying the cryptographic calculation considered here corresponds, on the one hand, to the second result, that is to say the result obtained at the end of step 14 resulting from the combination of the second and third affine operations, and, on the other hand, to an encrypted combination of the two random values.

Here, the first, second and third affine operations, respectively $\sigma_K$, $\sigma_{K1}$ and $\sigma_{K2}$, can verify the following equations:

$$\sigma_K(x)=x\oplus K$$

$$\sigma_{K1}(x)=x\oplus K_1$$

$$\sigma_{K2}(x)=x\oplus K_2$$

where x is an input value;

where K, K1 and K2 are the first, second and third secret keys respectively, which verify the following equation:

$$K=K_1\oplus K_2$$

To encrypt a combination of r and r', it may be provided to apply a hash function or a pseudo-random function.

It may be advantageous to carry out such a method of executing a cryptographic calculation according to one embodiment of the present invention in the context of identifying a radio tag, such as one which uses for example an identification protocol of the type described in the document "A scalable, delegatable pseudonym protocol enabling ownership transfer of RFID tags" by David Molnar, Andrea Soppera and David Wagner, dated 2005.

An "RFID tag" is intended to mean a radio tag using the technology referred to as "radiofrequency identification". These comprise an antenna associated with an electronic chip so that they can receive and transmit messages. In such a context, identification data are stored on the radio tags.

In the context of the aforementioned document, an identification centre or "Trusted Centre" or "identification server" is in charge of identifying a radio tag based on the secret key associated therewith. To this end, it manages a plurality of secret keys in the form of a Q-ary tree, where Q is an integer greater than or equal to 2, each leaf of the tree corresponding to a secret key. The secret keys are represented in the form of pathway portions from the root of the tree to the leaf corresponding to the secret key that it is wished to represent. More specifically, for example, in the case of a binary tree, each pathway portion representing a key specifies the course of the tree by indicating at each node which of the two branches must be taken in order to reach the desired leaf.

Figure 2:
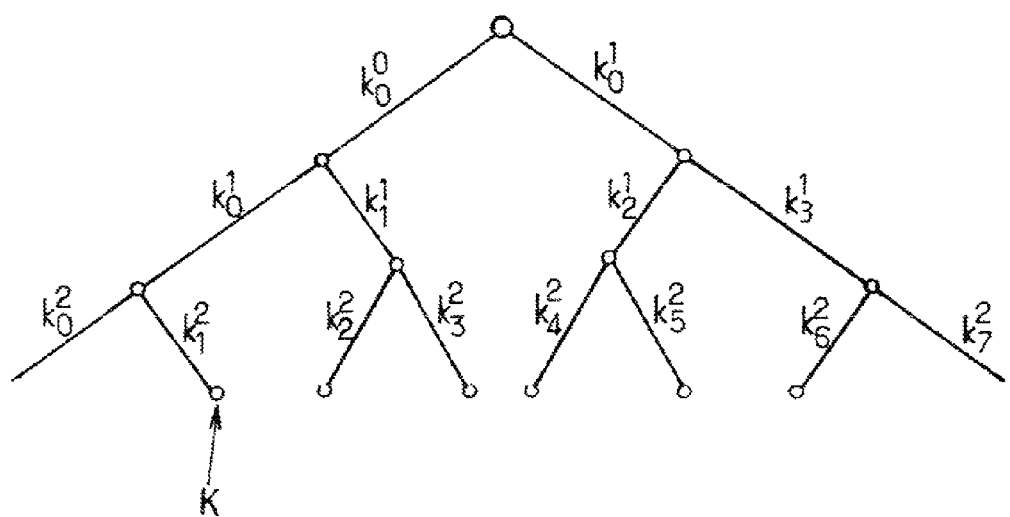
FIG. 2 shows a management of secret keys as a function of a binary tree according to one embodiment of the present invention.

FIG. 2 shows a management of secret keys according to such a tree, which is binary here. Thus, in such an identification system, the secret key used to identify a radio tag is represented in the form of a pathway in the binary tree.

For example, the representation, and therefore the storage and manipulation, of a key K corresponding to the leaf of the tree indicated by an arrow in FIG. 2 corresponds to $k_0^0 k_0^1 k_1^2$.

Figure 3:
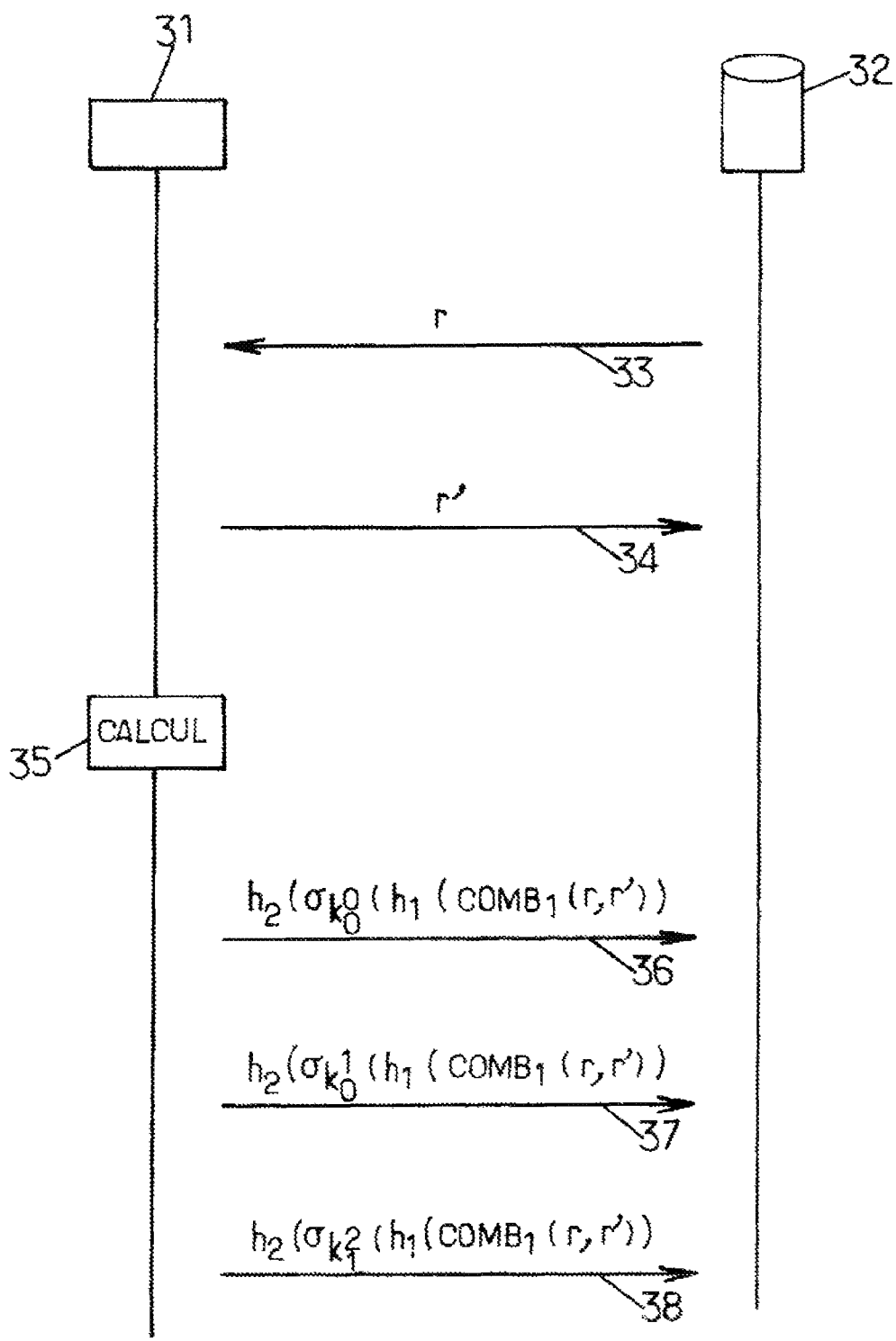
FIG. 3 shows the main steps of a method of identifying a radio tag according to one embodiment of the present invention.

FIG. 3 shows the main steps of a method of identifying a radio tag in an identification system according to one embodiment of the present invention.

Such an identification system comprises a radio tag 31 and an identification server 32 managing secret keys according to a binary tree as shown in FIG. 2.

The radio tag 31 firstly receives from the identification server 32 a first random value r, then it generates a second random value r'.

It then applies a cryptographic calculation to the first and second random values based on the representation of its secret key in the form of the pathway of the tree, and transmits the result of the execution of this cryptographic calculation to the identification server. The latter then applies this cryptographic calculation to the respective representations of the different secret keys which correspond to the leaves of the tree that it manages. Thus, based on a comparison between the result received and the results obtained on the leaves of the tree, it is then able to determine which secret key is associated with this radio tag and thus it can identify the latter.

In this context, it is customary that the secret keys are distributed to the different radio tags as a function of a classification by type of use of these radio tags. Thus, for example, if these radio tags were used in banknotes, the secret keys assigned to banknotes of a given sum could correspond to secret keys which have in common the value of many of the bits.

In this case, when an attacker recovers the values either that have passed via the interface between the identification centre and the radio tag of a 500-euro banknote for example, or via a suitable radio tag reader, and when he also retrieves the representation as described above for the secret key of this 500-euro banknote, he may then hold enough information to locate banknotes of this value on the simple basis of the information passing between the identification centre and the radio tag of these banknotes. This is because, depending on the classification applied in the tree of the secret keys, holding information on the location of a secret key may provide secret information which is very useful on other leaves that depend on the same superior node.

In the context of managing secret keys via a Q-ary tree, the possible attack mentioned above is merely one example among many others in which, starting from the value of the secret key of one radio tag, it is possible to have access to confidential information on other radio tags.

In order to increase the level of security attached to the confidentiality of the secret key stored physically on the radio tag, it may be advantageous to protect against any intrusive attack by using the characteristic properties of a secret key storage and management as mentioned above in relation to keys of POK type.

Thus, it is provided here to carry out a method of executing the cryptographic calculation according to one embodiment of the present invention, on the radio tag.

Such a radio tag possesses a random value r received from the identification server and generates another random value r'. It can then execute, in a step 35, steps 11 to 15 of the method according to one embodiment of the present invention.

In the variant described here, the cryptographic operation of step 15 is applied to the result obtained in step 14.

The pathway portions of the secret key K, which corresponds for example to $k_0^0 k_0^1 k_1^2$, are processed one after the other according to the method in question.

In the example described, the method comprises a combination of the two random values r and r'. Then, a cryptographic operation $h_1$ is applied to this combination, followed by the linear bit permutation operation $\sigma_K$. Finally, a cryptographic operation $h_2$ is applied to the result of the bit permutation.

The result of such a calculation can be written as follows:

$$h_2(\sigma_K(h_1(\text{comb}_1(r,r'))))$$

where $\text{comb}_1(r,r')$ is a combination of the random values r and r'.

The method is applied to the portion $k_0^0$, and the result obtained, corresponding to $h_2(\sigma_K k_0^0(h_1(\text{comb}_1(r,r'))))$, is transmitted via a message 36 to the identification server 32. Next, it is applied to the portion $k_0^1$, and the result then obtained, corresponding to $h_2(\sigma_K k_0^1(h_1(\text{comb}_1(r,r'))))$, is transmitted to the identification server 32 via a message 37. Finally, this method is applied to the portion $k_1^2$, and the result obtained, corresponding to $h_2(\sigma_K k_1^2(h_1(\text{comb}_1(r,r'))))$, is transmitted to the identification server via a message 38.

The random values r and r' may either be retained for all the steps concerning all the parts of the secret key $k_0^0$, $k_0^1$, $k_1^2$ or be generated anew for each part of the secret key.

The server then possesses two random values r and r', like the radio tag. It applies calculations similar to those executed by the radio tag to the different secret keys of the tree until it can identify this radio tag by comparison with the encrypted value received from the latter.

It should be noted here that the identification server can itself execute such calculations without splitting the execution of the affine operation into two steps. As a result, a radio identification method according to one embodiment of the present invention remains compatible with existing identification servers.

Figure 4:
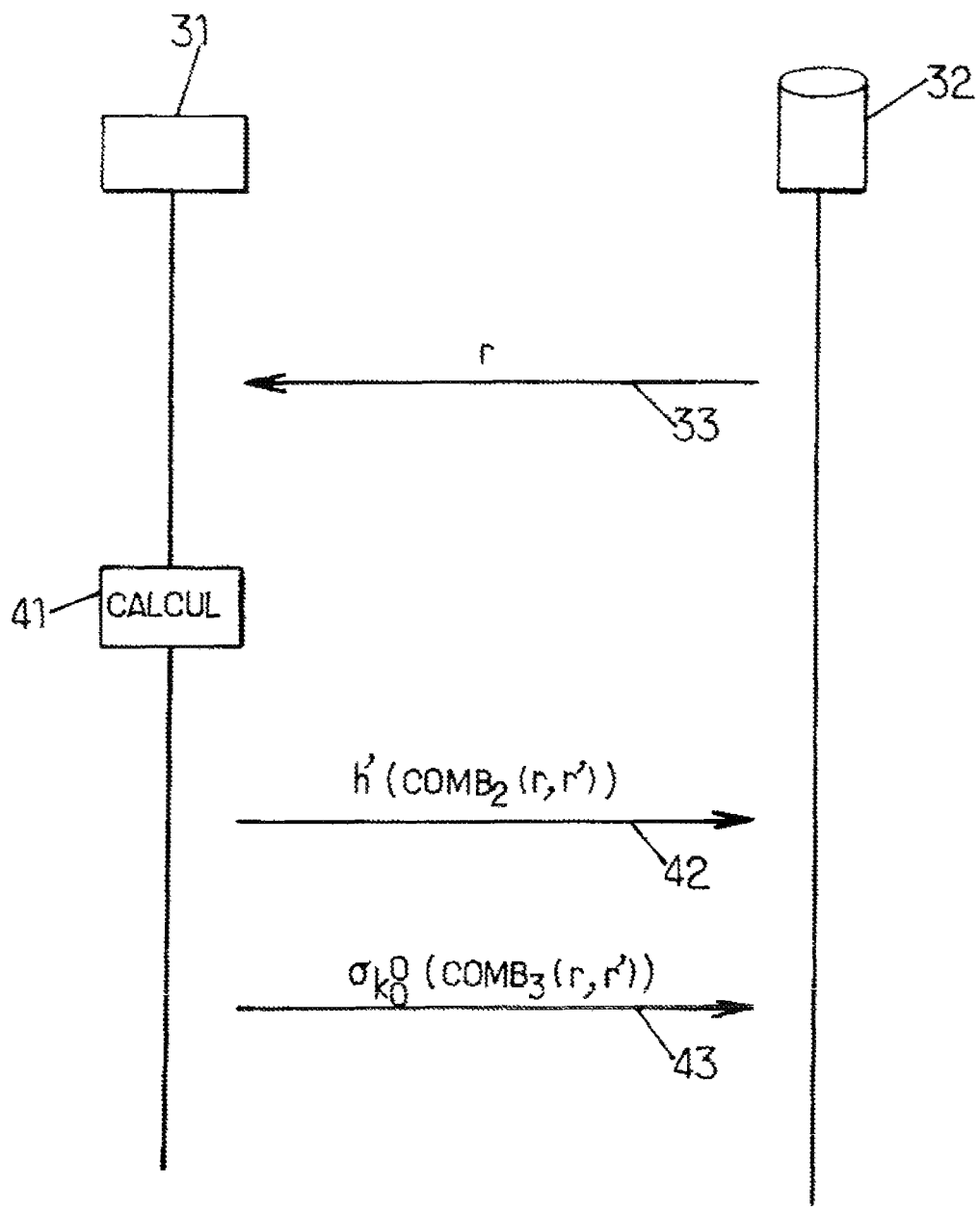
FIG. 4 shows the main steps of a method of identifying a radio tag according to another embodiment of the present invention.

FIG. 4 shows the main steps of a method of identifying a radio tag according to another embodiment of the present invention. In this application example, the cryptographic operation carried out in step 15 is applied to a combination of the two random values r and r'. In this case, the combination of the two random values may advantageously correspond to the random value r'.

Thus, in this context, the radio tag 31 does not transmit, as in the previous embodiment, the second random value to the identification server 32, but rather it is only an encrypted image of this second random value that is transmitted.

At the end of the cryptographic calculation according to a method of execution as described above, that is to say at the end of a step 41, the tag is able to transmit to the identification server 32 a message 42 indicating an encrypted combination of r and r', $h'(\text{comb}_2(r,r'))$, where h' is an encryption function which may be a hash function or a pseudo-random function for example, and where $\text{comb}_2$ is a combination of the values r and r'.

The following sections describe the steps of such an identification method applied only to the first portion of the secret key, it being possible to easily deduce the other steps relating to the other portions.

It transmits, via the message 43, the result of the application of the affine function a $k_0^0$ to a combination of r and r'.

Here, the result of the application of this affine function may correspond to the "exclusive or" operation between the key portion $k_0^0$ and the combination of r and r', the following equation being verified:

$$\sigma k_0^0 = k_0^0 \oplus \text{comb}_3(r,r')$$

where $\text{comb}_3$ is a combination of r and r'.

The random values r and r' may either be retained for all the steps concerning all the parts of the secret key $k_0^0$, $k_0^1$, $k_1^2$ or be generated anew for each part of the secret key.

In this example, in order to identify a radio tag, the identification server 32 possesses the first random value, an encrypted result of a combination of the two random values, and affine operations to be applied as a function of the keys managed.

Based on the secret keys managed in the identification server 32, on the encrypted combination of the random values r and r' which is received in the message 42, and on the content of the message 43, and also on the value of r, it is then able to verify whether it obtains the same encrypted combination of r and r', in order to identify the secret key used. It should be noted here that only an encrypted image of r' is received by the identification server.

In order to determine the value of the first part of the secret key, it can apply the following equations, for the first part of the secret key:

$$\text{comb}_3(r,r'_1) = k_0^0 \oplus (k_0^0 \oplus \text{comb}_3(r,r')); \text{ and}$$

$$\text{comb}_3(r,r'_2) = k_0^1 \oplus (k_0^0 \oplus \text{comb}_3(r,r'));$$

where $(k_0^0 \oplus \text{comb}_3(r, r'))$ corresponds to the content of the message 42 received; and where $\text{comb}_3(r, r'_1)$ and $\text{comb}_3(r, r'_2)$ are potential candidates for the combination of the two random values r and r'.

Next, it applies the same cryptographic operation h as the one that was applied in the radio tag to the combination of r and $r'_1$ and to the combination of r and $r'_2$. It then compares the two values obtained at the end of these calculations relating to the cryptographic operation, and then determines the value of the first part of the secret key.

It determines the secret key in its entirety by proceeding in the same way for all the portions of the secret key.

The invention claimed is:

1. A method, comprising:
   executing a cryptographic calculation in an electronic component, according to a given cryptographic algorithm, the executing including applying a one-way function which is disabled upon an intrusion into the electronic component; said one-way function being based on a first affine operation which corresponds to a first secret key;
   said executing including the following steps relating to applying said one-way function:
   (a) obtaining first and second random values;
   (b) obtaining a first result by applying a second affine operation, which corresponds to a second secret key, to a first combination of the first and second random values;
   (c) obtaining a second result by applying a third affine operation, which corresponds to a third secret key, to said first result; wherein a combination of the third and second affine operations corresponds to the first affine operation; and
   applying a cryptographic operation to at least one of said second result and a second combination of the first and second random values.

2. A method according to claim 1, wherein the cryptographic operation corresponds to one of a hash function and a pseudo-random function.

3. A method according to claim 1, wherein the cryptographic operation is applied to the second result, and the first, second and third affine operations correspond to bit-level permutations.

4. A method according to claim 3, wherein the first combination of the first and second random values corresponds to applying a cryptographic operation taking as input the first and second random values.

5. A method according to claim 4, in which the cryptographic operation corresponds to a hash function.

6. A method according to claim 1, wherein the first combination of the first and second random values corresponds to applying an "exclusive or" operation between the first and second random values.

7. A method according to claim 1, wherein:
   the cryptographic operation is applied to the second combination of the first and second random values;
   the first, second and third affine operations correspond to "exclusive or" operations with the first, second and third secret keys respectively; and
   the first secret key is equal to the result of an "exclusive or" operation between the second and third secret keys.

8. A method according to claim 1, comprising:
   identifying a radio tag at an identification server, the identification server managing a plurality of secret keys according to a Q-ary tree having a root and a plurality of leaves, where Q is an integer greater than or equal to 2, each leaf of the tree corresponding to one secret key; one secret key of said plurality of secret keys being associated with said radio tag; said identifying including the following steps on said radio tag:
   (1) receiving the first random value from the identification server;
   (2) generating the second random value;
   (3) performing the executing step based on at least part of said secret key associated with said radio tag; and
   (4) transmitting said second result to the identification server.

9. A method according to claim 8, further comprising obtaining a third result by applying the cryptographic operation to the second result; wherein, in step (4), the third result and the second random value are transmitted to the identification server.

10. A method according to claim 8, further comprising obtaining a fourth result by applying the cryptographic operation to a second combination of the first and second random values; wherein, in step (4), the second result and the fourth result are transmitted to the identification server.

11. A method according to claim 8, wherein: the secret key associated with the radio tag is represented by a plurality of parts respectively representing portions of a pathway from the root of the tree to the leaf corresponding to the secret key associated with the radio tag, and steps (1) to (4) are repeated for each of said parts of the secret key associated with the radio tag.

12. An electronic component suitable for executing a cryptographic calculation according to a given cryptographic algorithm including at least one application of a one-way function which is disabled upon an intrusion into the electronic component;
   said one-way function being based on a secret key which corresponds to a first affine operation;
   said electronic component comprising electronic hardware configured to implement the method according to claim 1.

13. A radio tag comprising the electronic component according to claim 12, said tag being suitable for implementing the method according to claim 8.

14. A radio tag identification system, comprising an identification server and the tag according to claim 13.

* * * * *

UNITED STATES PATENT AND TRADEMARK OFFICE
CERTIFICATE OF CORRECTION

PATENT NO. : 8,681,972 B2
APPLICATION NO. : 12/600197
DATED : March 25, 2014
INVENTOR(S) : Chabanne et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1136 days.

Signed and Sealed this
Twenty-ninth Day of September, 2015

Michelle K. Lee
*Director of the United States Patent and Trademark Office*